US012234124B2

(12) United States Patent
Kashiwakura

(10) Patent No.: US 12,234,124 B2
(45) Date of Patent: Feb. 25, 2025

(54) ELEVATOR CAR DOOR DETECTION APPARATUS

(71) Applicant: FUJITEC CO., LTD., Hikone (JP)

(72) Inventor: Hiroshi Kashiwakura, Hikone (JP)

(73) Assignee: FUJITEC CO., LTD., Hikone (JP)

( * ) Notice: Subject to any disclaimer, the term of this patent is extended or adjusted under 35 U.S.C. 154(b) by 0 days.

(21) Appl. No.: 18/242,783

(22) Filed: Sep. 6, 2023

(65) Prior Publication Data

US 2024/0083714 A1 Mar. 14, 2024

(30) Foreign Application Priority Data

Sep. 14, 2022 (JP) ................................ 2022-145832

(51) Int. Cl.
*B66B 13/22* (2006.01)
*B66B 13/18* (2006.01)

(52) U.S. Cl.
CPC ........... *B66B 13/22* (2013.01); *B66B 13/185* (2013.01); *B66B 2201/46* (2013.01)

(58) Field of Classification Search
CPC .... B66B 13/22; B66B 13/185; B66B 2201/46
See application file for complete search history.

(56) References Cited

U.S. PATENT DOCUMENTS 4,529,065 A * 7/1985 Kraft ...................... B66B 13/08 187/314
6,006,866 A * 12/1999 Horne .................... B66B 13/16 187/331
8,960,372 B2 * 2/2015 Heath .................. B66B 13/185 49/506
11,124,388 B2 * 9/2021 Birrer .................. B66B 1/3492
2012/0006629 A1 * 1/2012 Heath .................. B66B 13/185 187/335
2024/0034593 A1 * 2/2024 Villa .................... B66B 1/3492
2024/0083714 A1 * 3/2024 Kashiwakura ........ B66B 13/185

FOREIGN PATENT DOCUMENTS

| | | | |
|---|---|---|---|
| CN | 114074888 | A * | 2/2022 |
| EP | 2653425 | A1 | 10/2013 |
| JP | H1067480 | A | 3/1998 |
| JP | 2010137956 | A | 6/2010 |
| JP | 2012121695 | A | 6/2012 |
| JP | 202294573 | A | 6/2022 |
| WO | 2012081090 | A1 | 6/2012 |

* cited by examiner

*Primary Examiner* — Michael A Riegelman
(74) *Attorney, Agent, or Firm* — The Webb Law Firm

(57) ABSTRACT

Car doors hanging down via door hangers are disposed on a door rail that is disposed on a vertically-oriented frame disposed above an entrance of a car and extends along a width direction of the entrance of the car. One of a magnetic proximity switch and a target for detecting that the car doors are fully open and fully closed is disposed on a horizontal part extending from an upper end of the frame toward the entrance of the car. The remaining one of the magnetic proximity switch and the target is disposed on an extending part extending from each of the door hangers so as to be opposed in a vertical direction to the one of the magnetic proximity switch and the target for detection.

2 Claims, 5 Drawing Sheets

ELEVATOR CAR DOOR DETECTION APPARATUS

CROSS-REFERENCE TO RELATED APPLICATION

This application claims priority to Japanese Patent Application No. 2022-145832 filed Sep. 14, 2022, the disclosure of which is hereby incorporated by reference in its entirety.

BACKGROUND OF THE INVENTION

Field of the Invention

The present invention relates to an elevator car door detection apparatus configured to detect full opening and full closure of a car door.

Description of Related Art

In the elevator, the car door opens and closes, for example, with a motor as a driving source arranged at an upper end of a vertically-oriented frame disposed above an entrance of a car. A landing door engages with the car door, and is configured to open and close in association with the opening and closing of the car door. The frame includes a horizontal plate part formed of its upper end part bent to a back side in a depth direction of the car. The motor is placed on the horizontal plate part and fixed thereto (see, for example, FIG. 2 of JP 2022-094573 A).

In controlling opening and closing of the car door, full opening and full closure of the car door need to be detected. Proposed for example is an apparatus configured to detect full opening and full closure of the car door based on the number of pulses from an encoder disposed on a shaft of the motor (see, for example, FIG. 2 of JP H10-067480 A).

The detection of full opening and full closure using the encoder depends on the resolution of the encoder, that is, the performance of the encoder; thus, there are some cases where some encoders cannot make precise detection.

Another proposed apparatus is an apparatus configured to detect the full opening and full closure of the car door using a magnetic proximity switch disposed on a front surface on an entrance side of a frame that is configured to detect a detection plate disposed on a door hanger so as to be opposed to the magnetic proximity switch when the car door is fully open and fully closed.

SUMMARY OF THE INVENTION

Since the magnetic proximity switch generally has a shorter detection distance than that of a photoelectric switch, the positional relationship between the proximity switch and the detection plate needs to be precisely adjusted in the depth direction and in the vertical direction. Thus, the apparatus using the magnetic proximity switch involves time-consuming and troublesome works such as factory assembly or on-site installation and adjustment, and has some room for improvement.

It is therefore an object of the present disclosure to provide an elevator car door detection apparatus requiring only a simple adjustment to enable precise detection of full opening and full closure of a car door.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An elevator car door detection apparatus of the present invention includes: a vertically-oriented frame disposed above an entrance of a car; a door rail disposed on the frame so as to extend along a width direction of the entrance of the car; a car door hanging down from the door rail via a door hanger; and a target and a magnetic proximity switch for detecting the target to detect that the car door is fully open and fully closed, the frame including a horizontal part extending from an upper end of the frame toward the entrance of the car, the door hanger including an extending part extending upward from the door hanger, in which one of the target and the magnetic proximity switch is disposed on the horizontal part, and the remaining one of the target and the magnetic proximity switch is disposed on the extending part so as to be opposed in a vertical direction to the one of the target and the magnetic proximity switch to enable detection.

The elevator car door detection apparatus can be configured to further include a motor attached to one end portion in the width direction of the frame; and a rotating body attached to an other end portion in the width direction of the frame for allowing an endless body to be looped over the rotating body and the motor, in which the extending part is a connecting member for connecting the door hanger and the endless body to each other, the target is disposed on the connecting member, and the magnetic proximity switch is disposed on the horizontal part.

The elevator car door detection apparatus can be configured to further include a full closure stopper disposed on a portion of the frame corresponding to an end on a fully closed side of the car door so as to come into contact with a contact part disposed on the connecting member when the car door is fully closed, in which the magnetic proximity switch and the target are disposed at positions close to the full closure stopper so as to detect that the car door is fully closed.

In the present disclosure, an elevator car door detection apparatus requiring only a simple adjustment to enable precise detection of full opening and full closure of a car door can be provided by the configuration that one of a magnetic proximity switch and a target is disposed on a horizontal part extending from an upper end of a vertically-oriented frame toward an entrance of a car while the remaining one of the magnetic proximity switch and the target is disposed on an extending part extending upward from a door hanger.

BRIEF DESCRIPTION OF THE DRAWINGS

The foregoing and other features of the present invention will become apparent from the following description and drawings of an illustrative embodiment of the invention in which.

DESCRIPTION OF THE INVENTION

A description will be hereinafter given on one embodiment of an elevator car door detection apparatus according to the present invention with reference to the drawings.

Figure 1:
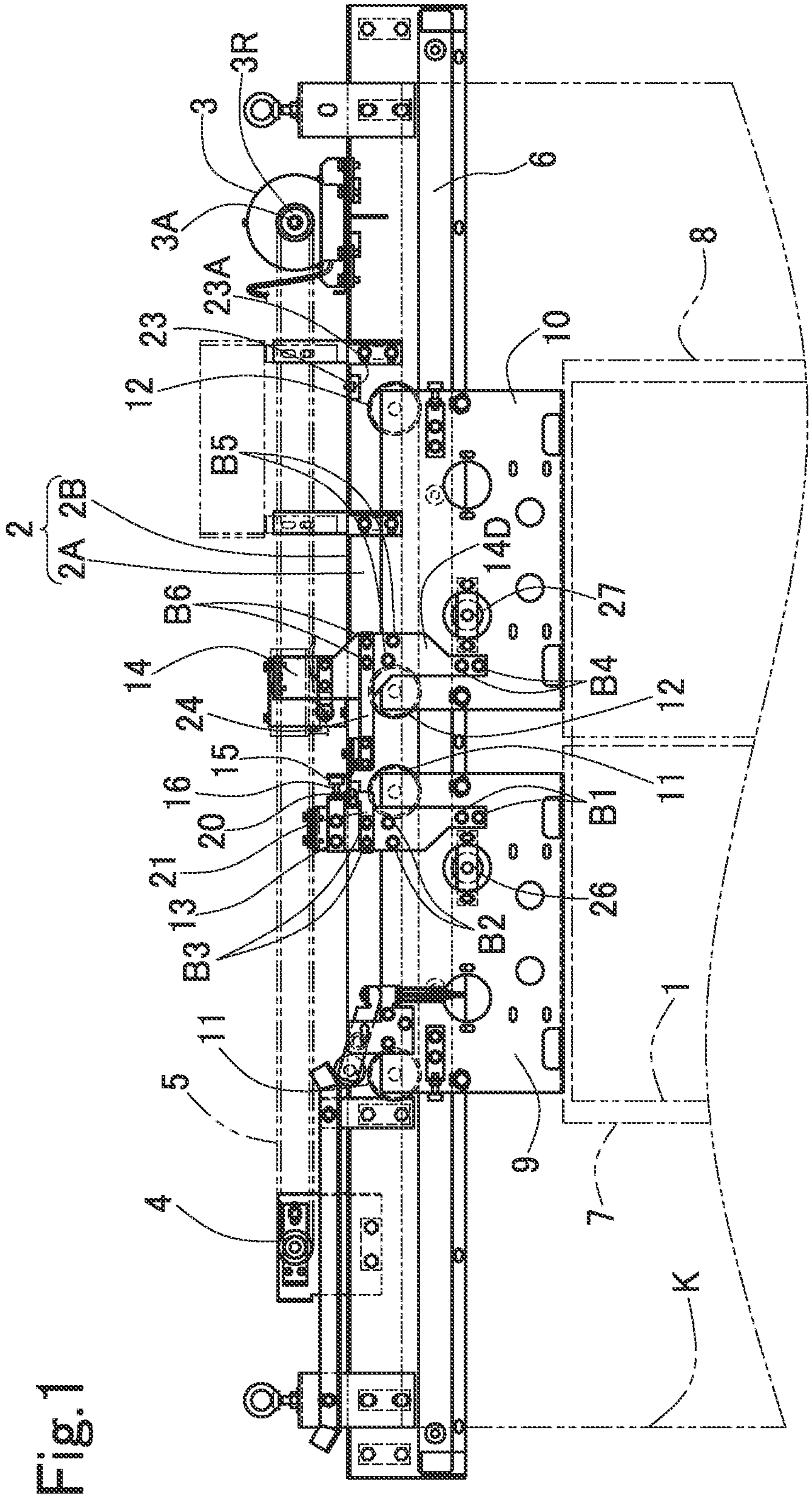
FIG. 1 is a schematic front view of a car door driving assembly equipped with an elevator car door detection apparatus according to this embodiment.

FIG. 1 shows a car door driving assembly equipped with the elevator car door detection apparatus. FIG. 1 is a view as viewed from a landing floor side. In FIG. 1, a vertically-oriented plate-shaped frame (also referred to as support frame) 2 extending along a width direction (hereinafter referred to as right and left direction) of an entrance 1 of a car K is fixed to the car above the entrance 1 of the car K. The frame 2 includes a vertical part 2A opposed to a car wall (not shown) above the entrance 1 of the car K, and a horizontal part 2B formed by bending the frame 2 along an upper end of the vertical part 2A to horizontally extend toward a landing floor side (i.e., forward side of FIG. 1).

A motor 3 for opening and closing operation of car doors 7 and 8 is fixed to one end portion in the right and left direction (i.e., right end portion) of the horizontal part 2B of the frame 2. The motor 3 has a driving shaft 3A to which a toothed driving pulley 3R configured to integrally rotate with the driving shaft 3A is attached. A toothed driven pulley 4 as a rotating body with its rotating shaft positioned at substantially the same height as the driving shaft 3A of the motor 3 is disposed at the other end portion in the right and left direction (i.e., left end portion) of the horizontal part 2B of the frame 2. The toothed driving pulley 3R and the toothed driven pulley 4 have an endless body 5 looped thereover, which is formed of a toothed belt (which can alternatively be a rope, a chain, or the like) having teeth formed on its inner peripheral surface so as to engage with teeth formed on outer circumferential surfaces respectively of the toothed driving pulley 3R and the toothed driven pulley 4.

A door rail 6 extending along the right and left direction of the entrance 1 of the car K is attached to the front side of a lower end portion of the vertical part 2A of the frame 2. The first car door 7 and the second car door 8 hang down from the door rail 6 respectively via door hangers 9 and 10. A pair of left and right rollers 11, 12 rolling along the door rail 6 are disposed on each of the door hangers 9 and 10. Each of the first car door 7 and the second car door 8 has a vertically elongated, substantially rectangular shape.

The door hangers 9 and 10 for allowing the first car door 7 and the second car door 8 to hang down are attached respectively to upper ends of the first car door 7 and the second car door 8. One (left one in FIG. 1) door hanger 9 is connected to a lower portion of the endless body 5 via a first connecting member 13 while the other door hanger 10 is connected to an upper portion of the endless body 5 via a second connecting member 14.

Thus, the configuration that the motor 3 is driven to rotate in one direction to turn the endless body 5 in the one direction enables the first car door 7 and the second car door 8 that are fully closed (located at the closed position) to move to separate from each other to make the car doors fully open (located at the open position). Further, the configuration that the motor 3 is driven to rotate in the other direction to turn the endless body 5 in the other direction enables the first car door 7 and the second car door 8 that are fully open to move to become close to each other to make the car doors fully closed (see FIG. 1).

The first connecting member 13 is made of a metal. As shown in FIG. 3, FIG. 5A, FIG. 5B, and FIG. 5C, the first connecting member 13 includes a lower part 13A vertically elongated and having a plate shape, and a horizontal part 13B having a vertically elongated shape and formed by bending an upper end portion of the first connecting member 13 in a depth direction of the car K (in a direction penetrating the paper surface). The first connecting member 13 further includes an upper part 13C having a larger width in the right and left direction than that of the lower part 13A, and a connecting part 13D connecting the upper part 13C and the lower part 13A to each other and having a larger width in the right and left direction as it advances upward.

Figure 5C:
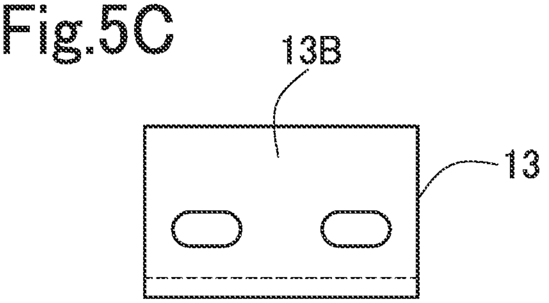
FIG. 5C is a plan view of the connecting member.
Figure 5A:
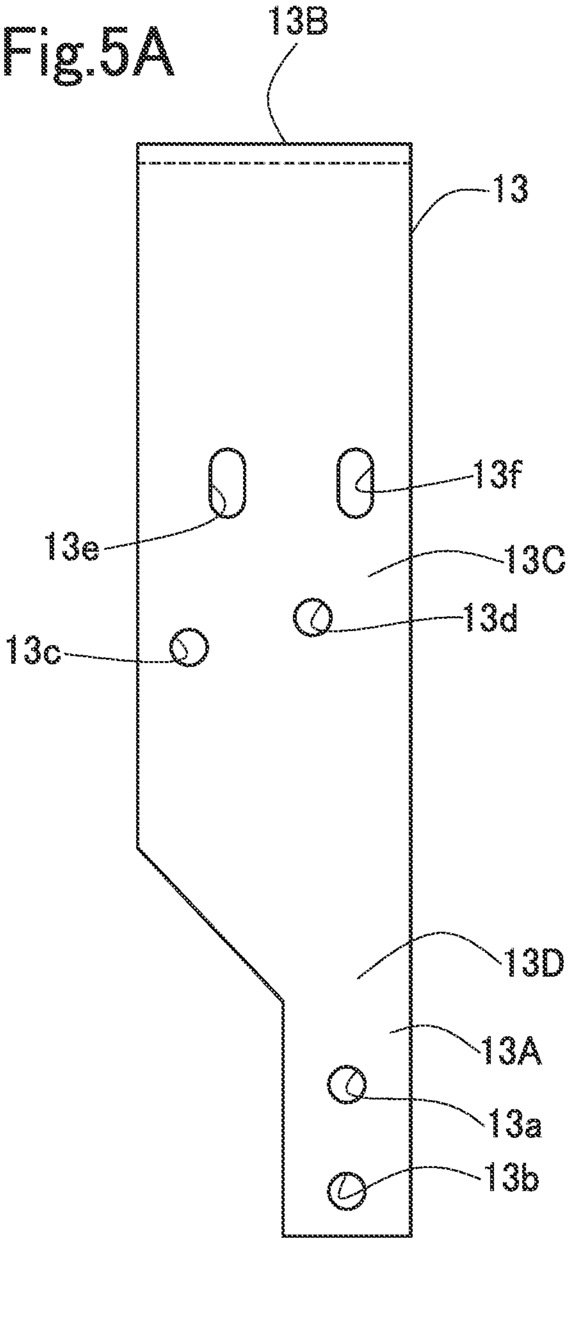
FIG. 5A is a front view of a connecting member to which the detection plate in FIG. 4A is attached.
Figure 5B:
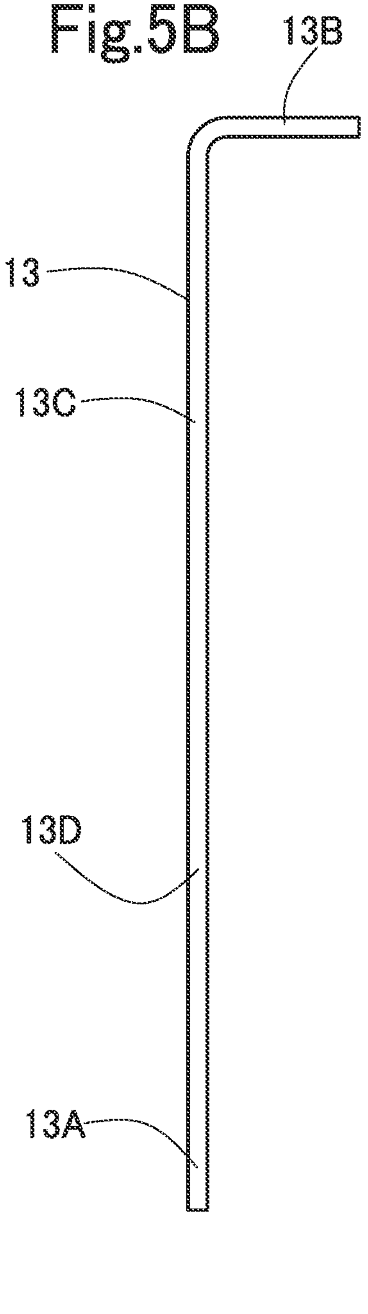
FIG. 5B is a side view of the connecting member.

The lower part 13A has a pair of upper and lower bolt through holes 13*a* and 13*b* formed therethrough, and the upper part 13C has a pair of left and right bolt through holes 13*c* and 13*d* formed through a lower end portion of the upper part 13C (see FIG. 5A). The right side bolt through hole 13*d* out of the left and right bolt through holes 13*c* and 13*d* formed through the lower end portion of the upper part 13C is located at a position higher than the left side bolt through hole 13*c*. Four bolts B1 and B2 penetrating through these four bolt through holes 13*a*, 13*b*, 13*c*, and 13*d* are used to fix the first connecting member 13 to the left door hanger 9 (see FIG. 3).

A contact part 15 configured to be brought into contact with a full closure stopper 19 attached to the frame 2 when the car doors 7 and 8 are fully closed is attached to an upper end portion of the upper part 13C via a bracket 17. The contact part 15 is formed of an elastic rubber disposed to cover a periphery of a head (not shown) of a bolt 16 that is screwed with a nut 18 disposed on the bracket 17. Full closure (the closed position) of the car doors 7 and 8 can be adjusted by rotating the bolt 16 to move in its axial direction relative to the nut 18 to thereby adjust a timing at which the contact part 15 comes into contact with the full closure stopper 19.

The full closure stopper 19 is formed of a bracket that includes a horizontal part 19A bolted to the frame 2, and a vertical part 19B formed by bending the full closure stopper 19 along a bolt side end (left end) of the horizontal part 19A to extend upward of the horizontal part 2B of the frame 2 so as to allow contact with the contact part 15.

As shown in FIG. 5A, the upper part 13C has a pair of left and right mounting holes 13*e* and 13*f* formed through a vertically intermediate portion of the upper part 13C for bolting a first detection plate 21 to be described later. These mounting holes 13*e* and 13*f* are long holes elongated in the vertical direction. The mounting holes 13*e* and 13*f* enable a minor adjustment of the position in the vertical direction of the first detection plate 21 described later within a length range of the long holes if such an adjustment is required.

Figure 2:
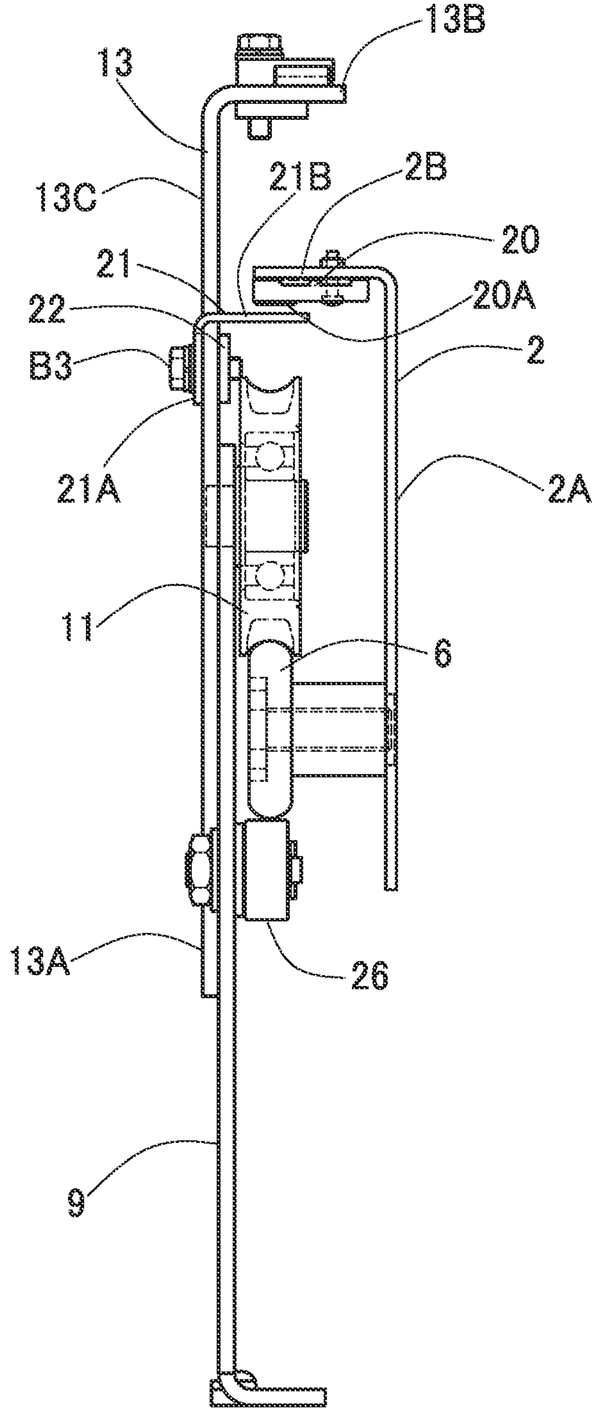
FIG. 2 is a side view of a magnetic proximity switch and a detection plate in FIG. 1 as viewed from their right side.
Figure 3:
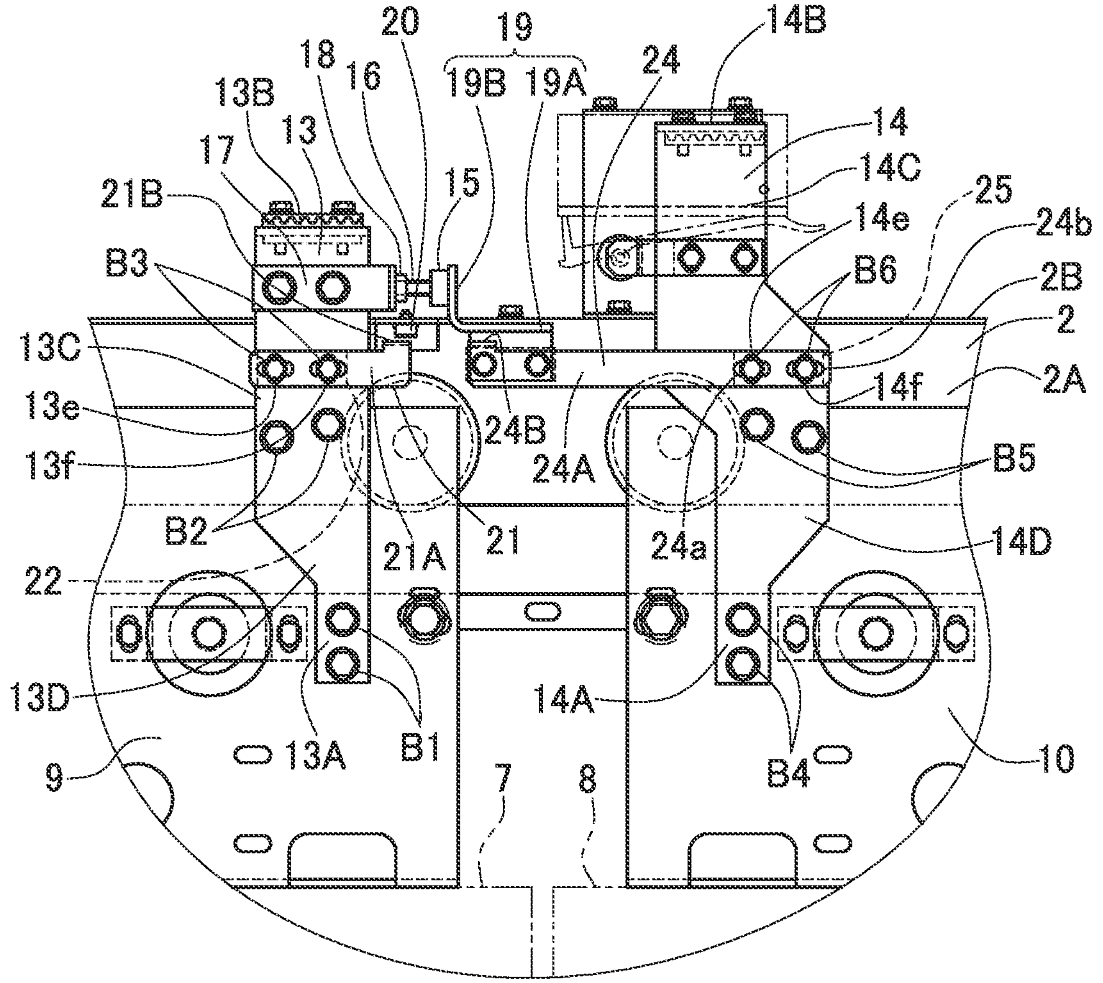
FIG. 3 is an enlarged view of an essential part of FIG. 1.

As shown in FIG. 2 and FIG. 3, a magnetic proximity switch 20 for detecting full closure and the first detection plate 21 made of a metal as a target are disposed at positions close to the full closure stopper 19 so as to detect that the car doors 7 and 8 are fully closed. Specifically, the magnetic proximity switch 20 for detecting full closure is fixed with screws to a lower surface of a portion of the horizontal part 2B of the frame 2 corresponding to the bolt 16, in the state where a detecting surface 20A from which a magnetic field generates faces downward. The first detection plate 21 is configured to be fixed to the first connecting member 13 by screwing a pair of left and right bolts B3 penetrating through the first detection plate 21 into a fixing member 22 to be described later while the first detection plate 21 is pressed to the vertically intermediate portion of the upper part 13C of the first connecting member 13. The first connecting member 13 forms an extending part extending upward from the door hanger 9.

As has been described, a worker disposes the magnetic proximity switch 20 for detecting full closure and the target (i.e., first detection plate 21) at a position close to the full closure stopper 19, in this embodiment at a position slightly on the left side of the full closure stopper 19. This configuration enables the worker to adjust the positions in the right and left direction of the magnetic proximity switch 20 and the target (first detection plate 21) while visually checking that the car doors 7 and 8 are fully closed, and thus enables the worker to precisely and quickly adjust the positions in the right and left direction of the magnetic proximity switch 20 and the target (first detection plate 21).

Figure 4A:
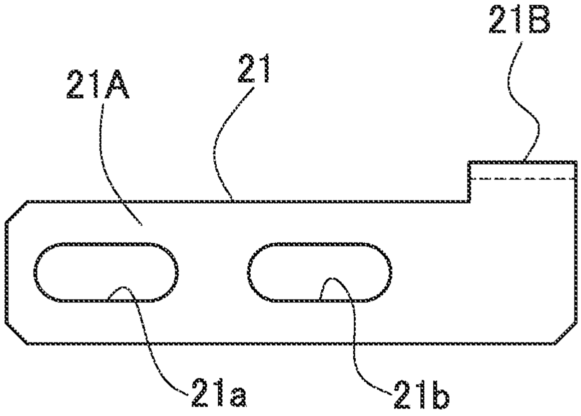
FIG. 4A is a front view of the detection plate.
Figure 4B:
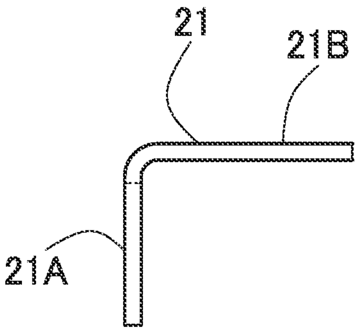
FIG. 4B is a side view of the detection plate.

As shown in FIG. 3, FIG. 4A, and FIG. 4B, the first detection plate 21 includes: a substantially-rectangular plate-shaped body part 21A fixed with bolts penetrating through the first connecting member 13 to the substantially-rectangular plate-shaped fixing member 22 disposed on a back surface of the first connecting member 13; and a horizontal part 21B extending from an upper end of an end (i.e., right end) portion in a door closing direction of the body part 21A toward a back side in the depth direction. The body part 21A has a pair of left and right through holes 21*a* and 21*b* for inserting the bolts B3 therethrough. These through holes 21*a* and 21*b* are long holes elongated in the right and left direction, and enable the position in the right and left direction of the first detection plate 21 to be adjusted relative to the first connecting member 13 within a length range of the long holes. When the car doors 7 and 8 move to the fully closed side to have the horizontal part 21B of the first detection plate 21 positioned under the detecting surface 20A of the magnetic proximity switch 20 for detecting full closure, magnetism generated from, for example, a detection coil (not shown) of the magnetic proximity switch 20 is shielded by the horizontal part 21B. When this magnetic shielding is detected, the first detection plate 21 is detected to be opposed in the vertical direction to the magnetic proximity switch 20. That is, full closure of the car doors 7 and 8 is detected.

The second connecting member 14 is made of a metal. As shown in FIG. 3, the second connecting member 14 includes: a lower part 14A vertically elongated and having a plate shape; a horizontal part 14B having a vertically elongated shape and formed by bending an upper end portion of the second connecting member 14 in the depth direction of the car K; an upper end part 14C having a larger width in the right and left direction than that of the lower part 14A; and a connecting part 14D connecting the upper end part 14C and the lower part 14A to each other and having a larger width in the right and left direction as it advances upward. The connecting part 14D is formed with its right side extending diagonally upward from an upper right end of the lower part 14A to the right side to increase the width in the right and left direction, and then with the left side and the right side extending diagonally upward from their respective upper ends to the left side to be connected to the upper end part 14C.

Similar to the first connecting member 13, the lower part 14A has a pair of upper and lower bolt through holes, and the connecting part 14D also has a pair of left and right bolt through holes formed through a vertically intermediate portion of the connecting part 14D. The right side bolt through hole of the connecting part 14D is located at a position lower than the left side bolt through hole. Four bolts B4 and B5 penetrating through these four bolt through holes are used to fix the second connecting part 14 to the left door hanger 10. The connecting part 14D has a pair of left and right mounting holes 14*e* and 14*f* formed through an upper end portion of the connecting part 14D for bolting a second detection plate 24 to be described later. These mounting holes 14*e* and 14*f* are long holes elongated in the vertical direction, and enable a minor adjustment of the position in the vertical direction of the second detection plate 24 described later within a length range of the long holes if such an adjustment is required.

A magnetic proximity switch 23 for detecting full opening and the second detection plate 24 made of a metal as a target are disposed so as to detect that the car doors 7 and 8 are fully open. Specifically, as shown in FIG. 1, the magnetic proximity switch 23 for detecting full opening is fixed with screws to a lower surface of a portion of the horizontal part 2B of the frame 2 corresponding to the right end of the car door 8, in the state where a detecting surface 23A from which a magnetic field generates faces downward. The second detection plate 24 is configured to be fixed to the second connecting member 14 by screwing a pair of left and right bolts B6 penetrating through the second detection plate 24 into a fixing member 25 (see FIG. 3) to be descried later while the second detection plate 24 is pressed to the upper end portion of the connecting part 14D of the second connecting member 14. The second connecting member 14 forms an extending part extending upward from the door hanger 10.

As shown in FIG. 3, the second detection plate 24 includes: a substantially-rectangular plate-shaped body part 24A fixed with bolts penetrating through the second connecting member 14 to the substantially-rectangular plate-shaped fixing member 25 disposed on a back surface of the second connecting member 14; and a horizontal part 24B extending from an upper end of an end in a door opening direction of the body part 24A toward a back side in the depth direction. The body part 24A has a pair of left and right through holes 24*a* and 24*b* for inserting the bolts B6 therethrough. The second detection plate 24 is the same as the first detection plate 21 except that the body part 24A has a larger length in the right and left direction than the length in the right and left direction of the body part 21A of the first detection plate 21. These through holes 24*a* and 24*b* are long holes elongated in the right and left direction, and enable the position in the right and left direction of the second detection plate 24 to be adjusted relative to the second connecting member 14 within a length range of the long holes. When the car doors 7 and 8 move to the fully open side to have the horizontal part 24B of the second detection plate 24 positioned under the magnetic proximity switch 23 for detecting full opening, magnetism generated from, for example, a detection coil (not shown) of the magnetic proximity switch 23 is shielded by the horizontal part 24B. When this magnetic shielding is detected, the second detection plate 24 is detected to be opposed in the vertical direction to the magnetic proximity switch 23. That is, full opening of the car doors 7 and 8 is detected.

In the present invention, the magnetic proximity switch 20 for detecting full closure and the magnetic proximity switch 23 for detecting full opening are disposed on the horizontal part 2B extending from the upper end of the frame 2 toward a side of the car entrance 1 (i.e., forward side in the depth direction of the car), and the first detection plate 21 and the second detection plate 24 as the targets are respectively disposed on the connecting members 13 and 14, which are extending parts extending respectively from the door hangers 9 and 10. This configuration enables the magnetic proximity switch 20 for detecting full closure and the magnetic proximity switch 23 for detecting full opening to be disposed to be opposed in the vertical direction to the first detection plate 21 and the second detection plate 24 respectively. This eliminates the necessity of adjusting the magnetic proximity switches 20 and 23 and the detection plates 21 and 24 in the depth direction of the car. Further, a distance in the vertical direction between the horizontal part 2B of the upper end of the frame 2 and the door rail 6 is precisely set. Thus, the positional relationship in the vertical direction between the magnetic proximity switches 20 and 23 and the detection plates 21 and 24 can be substantially set as desired simply by disposing the magnetic proximity switches 20 and 23 or the detection plates 21 and 24 on the horizontal part 2B of the upper end of the frame 2 and disposing the detection plates 21 and 24 or the magnetic proximity switches 20 and 23 on the connecting members 13 and 14 extending upward from the respective door hangers. This configuration almost relieves the worker of the positional adjustment in the vertical direction between the magnetic proximity switches 20 and 23 and the detection plates 21 and 24, or only requires a minor adjustment within a length range of the long holes in the vertical direction (i.e., the mounting holes 13*e* and 13*f* or 14*e* and 140 even if the positional adjustment is to be made; thus, time for the adjustment can be saved.

The configuration that the detection plates 21 and 24 are disposed respectively on the existing first connecting member 13 and the existing second connecting member 14 for connecting the door hangers 9 and 10 and the endless body 5 to each other can eliminate the necessity of any special member for attaching the detection plates 21 and 24. Further, the configuration that the magnetic proximity switches 20 and 23 are disposed on the fixed horizontal part 2B enables easy wiring for the magnetic proximity switches 20 and 23. Furthermore, the configuration that the magnetic proximity switches 20 and 23 are disposed on the horizontal part 2B of the upper end of the frame 2 in the state where the detecting surfaces 20A and 23A face downward can achieve the magnetic proximity switches 20 and 23 highly resistant to dust or water falling onto the detecting surfaces 20A and 23A from directly above or diagonally above.

The door hangers 9 and 10 respectively include rollers 26 and 27 in contact with or close to (in proximity to) the lower surface of the door rail 6 for preventing unexpected bouncing of the car doors 7 and 8 during opening or closing of the car doors 7 and 8. The rollers 26 and 27 are made of a metal material or an elastic material. The roller 26 on the car door 7 side is disposed on a right end portion of the door hanger 9 while the roller 27 on the car door 8 side is disposed on a left end portion of the door hanger 10. In this embodiment, the rollers 26 and 27 are disposed close to (in proximity to) the lower surface of the door rail 6, in which case a distance between the lower surface of the door rail 6 and an outer circumferential surface of each of the rollers 26 and 27 is set to be shorter (smaller) than a distance between the detecting surface 20A of the magnetic proximity switch 20 for detecting full closure and the upper surface of the first detection plate 21 (a distance between the detecting surface 23A of the magnetic proximity switch 23 for detecting full opening and the upper surface of the second detection plate 24 is also set to have the same distance). When the rollers 26 and 27 are made of an elastic material, the distance between the lower surface of the door rail 6 and the outer circumferential surface of each of the rollers 26 and 27 is set in consideration of an amount of deformation resulting from elastic deformation of each of the rollers 26 and 27. When the car doors 7 and 8 during opening and closing unexpectedly bounce, this configuration prevents the detecting surface 20A of the magnetic proximity switch 20 for detecting full closure (or the detecting surface 23A of the magnetic proximity switch 23 for detecting full opening) from coming into contact with the upper surface of the first detection plate 21 (or the upper surface of the second detection plate 24) to thereby prevent damage to the magnetic proximity switch 20 for detecting full closure or the magnetic proximity switch 23 for detecting full opening. In particular, the roller 26 is disposed to be positioned close to the magnetic proximity switch 20 for detecting full closure immediately before the car doors 7 and 8 are fully closed, that is, immediately before the magnetic proximity switch 20 for detecting full closure becomes opposed to the first detection plate 21 to detect that the car doors 7 and 8 are fully closed. This configuration can reliably prevent damage to the magnetic proximity switch for detecting full closure when the car doors 7 and 8 during opening or closing unexpectedly bounce.

Various modifications can be made to the present invention without departing from the gist of the present invention. Further, specific configurations of parts and members are not limited to the aforementioned embodiment.

The aforementioned embodiment has been described by taking, for example, the case where the target is a metallic detection plate, but the target can be a permanent magnet.

The aforementioned embodiment has been described by taking, for example, the case where the car doors 7 and 8 are double doors configured to move in different directions from each other for opening or closing the entrance, but the car doors 7 and 8 can be single-type doors configured to move in the same direction for opening and closing the entrance. The number of car doors can be arbitrarily changed.

The aforementioned embodiment has been described by taking, for example, the case where the magnetic proximity switches 20 and 23 are attached to the lower surface of the horizontal part 2B of the frame 2, but the configuration can be such that through holes for having the detecting surfaces 20A and 23A of the magnetic proximity switch 20 and 23 exposed downward therethrough are formed, and the magnetic proximity switches 20 and 23 are attached to the upper surface of the horizontal part 2B of the frame 2 so as to have the detecting surfaces 20A and 23A opposed to the through holes from above.

The aforementioned embodiment has been described by taking, for example, the case where the magnetic proximity switches 20 and 23 are disposed on the frame 2 and the targets are disposed respectively on the connecting members 13 and 14, but the configuration can be such that the magnetic proximity switches 20 and 23 are disposed respectively on the connecting members 13 and 14 and the targets are disposed on the frame 2.

The aforementioned embodiment has been described by taking, for example, the case where the extending parts extending upward from the door hangers 9 and 10 respectively serve as the connecting members 13 and 14, but the configuration can be such that the extending parts are formed as dedicated members different from the connecting members 13 and 14. The configuration can further be such that the extending parts extending upward from the door hangers 9 and 10 are formed integrally with the door hangers 9 and 10.

The aforementioned embodiment has been described by taking, for example, the case where each of the rollers 26 and 27 is respectively disposed not at a position directly under a corresponding one of the pairs of rollers 11 and 12 on the same side in the right and left direction but at a position displaced inward therefrom in the right and left direction, but the configuration can be such that each of the rollers 26 and 27 is disposed at a position directly under the corresponding one of the pair of the rollers 11 and 12. The configuration can further be such that each of the rollers 26 and 27 includes a pair of left and right rollers 26 and 27 in the same manner as in each of the pair of rollers 11 and 12. In this case, the configuration can be such that the roller in addition to each of the rollers 26 and 27 is an up-thrust roller made of a metal material. The up-thrust roller is to be disposed in contact with or close to (in proximity to) the lower surface of the door rail 6. In the case where the up-thrust roller is disposed close to (in proximity to) the lower surface of the door rail 6, a distance between an outer circumferential surface of the up-thrust roller and the lower surface of the door rail 6 is set to be longer (larger) than the distance between the outer circumferential surface of each of the rollers 26 and 27 and the lower surface of the door rail 6.

The aforementioned embodiment has been described by taking, for example, the case where the horizontal part 2B is formed by bending the upper end portion of the frame 2, but the configuration can be such that the horizontal part is formed by welding or bolting a separately formed horizontal plate material to the upper end of the frame.

An elevator car door detection apparatus of the present invention includes: a vertically-oriented frame disposed above an entrance of a car; a door rail disposed on the frame so as to extend along a width direction of the entrance of the car; a car door hanging down from the door rail via a door hanger; and a target and a magnetic proximity switch for detecting the target to detect that the car door is fully open and fully closed, the frame including a horizontal part extending from an upper end of the frame toward the entrance of the car, the door hanger including an extending part extending upward from the door hanger, in which one of the target and the magnetic proximity switch is disposed on the horizontal part, and the remaining one of the target and the magnetic proximity switch is disposed on the extending part so as to be opposed in a vertical direction to the one of the target and the magnetic proximity switch to enable detection.

According to the present invention, one of the magnetic proximity switch and the target is disposed on the horizontal part extending from the upper end of the vertically-oriented frame toward the entrance of the car while the remaining one of the magnetic proximity switch and the target is disposed on the extending part extending upward from the door hanger. Thus, the magnetic proximity switch and the target can be disposed to be opposed in the vertical direction to each other. This configuration can eliminate the necessity of adjusting the magnetic proximity switch and the target in a depth direction of the car. Further, the distance in the vertical direction between the door rail and the horizontal part of the upper end of the frame is precisely set. Thus, the positional relationship in the vertical direction between the magnetic proximity switch and the target can be substantially set as desired simply by disposing the magnetic proximity switch or the target on the horizontal part of the upper end of the frame and disposing the object to be disposed or the magnetic proximity switch on the extending part extending upward from the door hanger. This configuration substantially eliminates the necessity of positional adjustment in the vertical direction between the magnetic proximity switch and the target. Even if such a positional adjustment is to be made, this configuration only requires a minor adjustment and can thus save time for the adjustment.

The elevator car door detection apparatus can be configured to further include a motor attached to one end portion in the width direction of the frame; and a rotating body attached to an other end portion in the width direction of the frame for allowing an endless body to be looped over the rotating body and the motor, in which the extending part is a connecting member for connecting the door hanger and the endless body to each other, the target is disposed on the connecting member, and the magnetic proximity switch is disposed on the horizontal part.

As described above, the configuration that the target is disposed on the connecting member connecting the door hanger and the endless body to each other can eliminate the necessity of any special member for attaching the target. Further, the configuration that the magnetic proximity switch is disposed on the fixed horizontal part enables easy wiring for the magnetic proximity switch.

The elevator car door detection apparatus can be configured to further include a full closure stopper disposed on a portion of the frame corresponding to an end on a fully closed side of the car door so as to come into contact with a contact part disposed on the connecting member when the car door is fully closed, in which the magnetic proximity switch and the target are disposed at positions close to the full closure stopper so as to detect that the car door is fully closed.

As described above, the configuration that the magnetic proximity switch and the target are disposed at positions close to the full closure stopper so as to detect that the car door is fully closed enables the positional adjustment in the width direction of the magnetic proximity switch and the target while the full closure of the car door is visually checked; thus, the positional adjustment in the width direction of the magnetic proximity switch and the target can be precisely and quickly made.

The elevator car door detection apparatus of the present embodiment are as described above. However, the present invention is not limited thereto, and the design can be appropriately modified within the scope intended by the present invention. The operational advantage of the present invention is also not limited to the foregoing embodiments. That is, the embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. An elevator car door detection apparatus comprising:

a vertically-oriented frame disposed above an entrance of a car;

a door rail disposed on the frame so as to extend along a width direction of the entrance of the car;

a car door hanging down from the door rail via a door hanger; and a target and a magnetic proximity switch for detecting the target to detect that the car door is fully open and fully closed, the frame comprising a horizontal part extending from an upper end of the frame toward the entrance of the car, the door hanger comprising an extending part extending upward from the door hanger, the elevator car door further comprising:

a motor attached to one end portion in the width direction of the frame; and a rotating body attached to an other end portion in the width direction of the frame for allowing an endless body to be looped over the rotating body and the motor, wherein the extending part is a connecting member for connecting the door hanger and the endless body to each other, the target is disposed on the connecting member so as to be opposed in a vertical direction to the magnetic proximity switch to enable detection, and the magnetic proximity switch is disposed on the horizontal part.

2. The elevator car door detection apparatus according to claim 1, further comprising a full closure stopper disposed on a portion of the frame corresponding to an end on a fully closed side of the car door so as to come into contact with a contact part disposed on the connecting member when the car door is fully closed, wherein the magnetic proximity switch and the target are disposed at positions close to the full closure stopper so as to detect that the car door is fully closed.

* * * * *